United States Patent
Wang

(10) Patent No.: US 12,208,891 B2
(45) Date of Patent: Jan. 28, 2025

(54) FLAPPING ROTOR DEVICE WITH UPLINK VERTICAL ROTATION AND DOWNLINK HORIZONTAL ROTATION

(71) Applicant: Guangdong Guoshijian Technology Development Co., Ltd., Guangdong (CN)

(72) Inventor: Zhicheng Wang, Guangdong (CN)

(73) Assignee: Guangdong Guoshijian Technology Development Co., Ltd.

(*) Notice: Subject to any disclaimer, the term of this patent is extended or adjusted under 35 U.S.C. 154(b) by 0 days.

(21) Appl. No.: 17/774,746

(22) PCT Filed: Nov. 24, 2021

(86) PCT No.: PCT/CN2021/132860
§ 371 (c)(1),
(2) Date: May 5, 2022

(87) PCT Pub. No.: WO2022/111537
PCT Pub. Date: Jun. 2, 2022

(65) Prior Publication Data
US 2024/0158077 A1    May 16, 2024

(30) Foreign Application Priority Data
Nov. 26, 2020  (CN) .......................... 202011342108.0

(51) Int. Cl.
*B64C 33/02*     (2006.01)
*B64D 31/06*     (2006.01)

(52) U.S. Cl.
CPC .............. *B64C 33/02* (2013.01); *B64D 31/06* (2013.01)

(58) Field of Classification Search
CPC .............................. B64C 33/02; B64C 33/025
See application file for complete search history.

(56) References Cited

U.S. PATENT DOCUMENTS

2023/0159162 A1* 5/2023 Narahara .............. B64C 33/025

FOREIGN PATENT DOCUMENTS

| CN | 103552687 A | 2/2014 |
|---|---|---|
| CN | 104802983 A | 7/2015 |
| CN | 107284656 A | 10/2017 |
| CN | 112429210 A | 3/2021 |
| CN | 112441227 A | 3/2021 |
| CN | 112441229 A | 3/2021 |
| CN | 112550696 A | 3/2021 |
| JP | 2009023417 A | 2/2009 |

* cited by examiner

Primary Examiner — Nicholas McFall
(74) Attorney, Agent, or Firm — Jose Cherson Weissbrot

(57) ABSTRACT

A flapping rotor device with uplink vertical rotation and downlink horizontal rotation that includes a flapping rotor support, revolution main shafts, a revolution motor, a revolution drive gear set, rotation main shafts, servo motors, a rotor device and a controller; wherein front ends and tail ends of the revolution main shafts are correspondingly and vertically fixed with front rotation arms and rear rotation arms respectively, and the front rotation arms and the rear rotation arms are symmetrically arranged at the two sides of the revolution main shafts; the revolution motor is fixed on the flapping motor support and electrically connected to the controller, and the revolution motor is in drive connection with the revolution main shafts through the revolution drive gear set.

10 Claims, 3 Drawing Sheets

FLAPPING ROTOR DEVICE WITH UPLINK VERTICAL ROTATION AND DOWNLINK HORIZONTAL ROTATION

TECHNICAL FIELD

The present disclosure relates to the technical field of a wing, in particular to a flapping rotor device with uplink vertical rotation and downlink horizontal rotation.

BACKGROUND

A novel aircraft imitates the flying of birds. A flapping rotor aircraft has the advantages of vertical lift-off, hovering and the like of a rotor aircraft and a helicopter. The core working devices of the flapping rotor aircraft include flapping rotor devices arranged at the two sides of a fuselage. However, in prior art, the flapping rotor devices cancel out partial lift during the process of executing uplink and downlink actions, inducing a lower lifting efficiency of flapping rotor aircrafts. Meanwhile, in the prior art, the rotors in the flapping rotor devices typically keep rotating during the uplink and downlink process, causing a 360 degrees of rotation of rotation planes of the rotors therefore producing unstable lifts. Moreover, the rotation planes of the rotors negatively impact the lift during 360 degree rotation, further reducing the lifting efficiency of the flapping rotor aircraft.

SUMMARY

The present disclosure aims at, to some extent, solving at least one of the above technical problems existing in the prior art.

For this purpose, the present disclosure provides a flapping rotor device with uplink vertical rotation and downlink horizontal rotation, which not only improves the lift, but also improves the stability generating the lift.

To implement the solution, the present disclosure adopts the technical solution below:

A flapping rotor device with uplink vertical rotation and downlink horizontal rotation, which is symmetrically arranged at the two sides of a fuselage, including:

a flapping rotor support, revolution main shafts, a revolution motor, a revolution drive gear set, rotation main shafts, servo motors, a rotor device and a controller;

the revolution main shafts are arranged at the two sides of the fuselage through the flapping rotor support and rotationally connected to the flapping rotor support by bearings;

and axial center lines of the revolution main shafts are parallel to the axial central line of the fuselage. At the same time, the front ends and the tail ends of the revolution main shafts are correspondingly and vertically fixed with front rotation arms and rear rotation arms in respective, and the front rotation arms and the rear rotation arms are symmetrically arranged at the two sides of the revolution main shafts.

The revolution motor is fixed on the flapping rotor support and electrically connected to the controller, and at the same time, the revolution motor is in drive connection with the revolution main shafts through the revolution drive gear set;

the rotation main shafts are respectively arranged at the two sides of the revolution main shafts and parallel to the revolution main shafts, and at the same time the two ends of the rotation main shafts at each side of the revolution main shafts are rotationally connected to the front rotation arms and the rear rotation arms through the bearings;

the servo motors are fixed on the flapping rotor support and electrically connected to the controller, and at the same time the servo motors are in drive connection with the rotation main shafts correspondingly.

The rotor devices are correspondingly fixed on the rotation main shafts at the two sides of the revolution main shafts, the rotor devices include rotors, and the rotation planes of the rotors at the two sides of the revolution main shafts are vertical mutually. The rotors include central shafts, turntables and a plurality of rotation airfoils, central holes are formed in the centers of the turntables, the central shafts pass through the central holes and are rotationally connected to the turntables through the bearings, and at the same time the rotation airfoils are symmetrical double-convex airfoils;

when the revolution motor drives the revolution main shafts to drive the front rotation arms, the rear rotation arms, the revolution main shafts and the rotor devices to lift, one servo motor controls one rotation main shaft correspondingly, so as to correspondingly drive the rotation plane of the rotor at one side of the revolution main shaft to be always horizontal, and the rotation plane of the rotor at the other side of the revolution main shaft to be always vertical. When the revolution motor drives the revolution main shafts to drive the front rotation arms, the rear rotation arms, the rotation main shafts and the rotor devices to decline, one servo motor correspondingly controls one rotation main shaft, so as to correspondingly drive the rotation plane of the rotor at one side of the revolution main shaft to be converted to a vertical state, and the rotation plane of the rotor at the other side of the revolution main shaft to be converted to a horizontal state.

The present disclosure provides a flapping rotor device with uplink vertical rotation and downlink horizontal rotation. Under the control of the controller, the revolution motor drives the revolution main shaft to revolve and drives the front rotation arms, the rear rotation arms, the rotation main shafts and the rotor devices to go up and down. Since the rotation planes of the rotors at the two sides of the revolution main shafts are vertical to each other, the resistance mutually generated between the rotors at the two sides and the mutual disturbance may be avoided, the stability generating the lift is improved, and the rotation planes of the rotors at the two sides of the revolution main shafts can be avoided to be all vertical, therefore the lift may be provided at least by the rotor at one side of the revolution main shaft, thereby generating the lift continuously and further improving the efficiency of generating the lift. At the same time, when the rotor at one side of the revolution main shaft lifts along the revolution main shaft, the rotor surface always keeps vertical, and the rotor surface is converted to keep horizontal through the serve motor during the process of lifting along the revolution main shaft. Meanwhile, when the rotor at the other side of the revolution main shaft lifts along the revolution main shaft, the rotor surface always keeps horizontal, and the rotor surface is converted to keep vertical through the serve motor during the process of lifting along the revolution main shaft, so that when the revolution main shafts drive the rotors to go up and down, the rotation plane of the rotor at one side of the revolution main shaft always keeps horizontal, therefore the lift of the present disclosure is obviously improved, and the stability generating the lift is obviously enhanced.

Preferably, the front edge of the symmetrical double-convex airfoil is convex arc while the rear edge is a flat airfoil structure, an upper plane and a lower plane are arc, so as to ensure that the speed towards the direction of the front edge is generated when airflow passes through the symmetrical double-convex airfoil, and then the continuous and upward lift may be ensured in combination with the flapping speed of the flapping rotor and in accordance with the fluid mechanics.

Preferably, the roots of a plurality of rotation airfoils are uniformly fixed on the turntables along a circumferential direction and form a 0-degree dip angle with the turntables, and at the same time the rotation direction of the front edges of the plurality of rotation airfoils along the shaft is the same.

Since the dip angle between the rotation airfoils and the turntables in the present disclosure is 0 degree, and the rotation direction of the front edges of the plurality of rotation airfoils along the shaft is the same, regardless of the upward front or the upward back of the airfoil during the rotation process of the main shaft, a maximum upward lift may generate as long as the rotation planes of the airfoils are horizontal. Moreover, when the rotation planes of the airfoils are inclined, partially upward lift may generate, therefore the present disclosure may provide greater lift.

Preferably, each rotor device further includes an installation frame, the shaft end of each central shaft is fixed on an inner wall of the installation frame, at the same time an outer wall of the installation frame is fixed on the rotation main shaft, and the present disclosure may provide the protection for the rotor through the installation frame.

Preferably, the installation frame is a hexahedral structure, of which two pairs of relative surfaces are provided with panels, and the other pair of surfaces is hollow;
wherein a pair of relative panels is fixed with the rotation main shaft, and the other pair of relative panels is correspondingly fixed at the two ends of the central shaft.

In the present disclosure, the installation frame is set as a hexahedral structure, of which two pairs of relative surfaces are provided with the panels, and the other pair of surfaces is hollow, so that the rotation main shaft may be fixed through the installation frame, the rotor is arranged on the rotation main shaft, and a support surface may be provided to fix the central shaft. At the same time, airflow is provided in the direction of the hollow surface, so that the turntable of the rotor may rotate around the central shaft under the drive of the airflow, and the effect of keeping rotation of the rotor is achieved.

Preferably, the installation frame is a U-shaped structure, which includes two first panels arranged relatively and a second panel connecting to the two first panels, wherein the two first panels arranged relatively are fixed on the rotation main shaft, and one shaft end of the central shaft is fixed on the second panel.

In the present disclosure, the installation frame is set as the two first panels arranged relatively and the second panel connecting with the two first panels, so that the first panels arranged relatively may be fixedly connected with the rotation main shaft, the rotor is arranged on the rotation main shaft and the central shaft is fixed through the second panel, and the airflow can be provided in other directions to drive the turntable of the rotor to rotate relatively to the central shaft, therefore the strength of the airflow driving the turntable to rotate may be improved, and the cost is reduced.

Preferably, the present disclosure further includes a tension device, which includes a tension aerofoil and an angle of attack regulation mechanism. The tension device is threaded on the front rotation arm and rotationally connected with the front rotation arm by the bearing, the angle of attack regulation mechanism is installed on the revolution main shaft and the front rotation arm, and electrically connected with the controller, so as to drive the tension aerofoil to tilt around the front rotation arm to generate an angle of attack. Meanwhile, the tension aerofoil is of the same structure as the rotation aerofoil, and the front edge of the tension aerofoil is towards the front end of the fuselage.

In the present disclosure, the front rotation arm is rotationally connected with the tension aerofoil, the tension aerofoil is of the same structure as the rotation aerofoil, and the front edge of the tension aerofoil is towards the front end of the fuselage, so the angle of attack of the tension aerofoil may be regulated under the drive of the angle of attack regulation mechanism, then the tension that the fuselage navigates onwards may be changed by providing the tension aerofoil, meanwhile the lift may be assisted, then the lifting efficiency may be improved, and maneuverability is achieved.

Preferably, the angle of attack regulation mechanism includes a first angle of attack regulation mechanism and a second angle of attack regulation mechanism; and the first angle of attack regulation mechanism includes a first regulation sleeve, a first angle of attack regulation motor, a bevel gear set, a second drive shaft, a cylindrical gear and a second sleeve;
the first regulation sleeve is threaded on the front rotation arm, and one end of the first regulation sleeve is fixed at the side end of the tension aerofoil while the other end is provided with a gear;
the second sleeve is fixed on the front rotation arm through a connecting rod, at the same time rotationally connected with the front rotation arm through the bearing, and the second drive shaft penetrates through the second sleeve and is rotationally connected with the inner wall of the second sleeve through the bearing;
the first angle of attack regulation motor is fixed on the revolution main shaft, an output shaft of the first angle of attack regulation motor is connected with one end of the second drive shaft through the bevel gear set, at the same time the other end of the second drive shaft is connected with the cylindrical gear, which meshes with gear teeth on the first regulation sleeve;
the first angle of attack regulation motor is electrically connected with the controller, and drives the first regulation sleeve to title around the front rotation arm through the bevel gear set, the second drive shaft and the cylindrical gear successively, so as to drive the tension aerofoil to tilt and generate the angle of attack.

In the present disclosure, the driving force is provided by the first angle of attack regulation motor, and a dynamic torque is delivered to the first regulation sleeve fixed in the tension airfoil through the drive among the bevel gear set, the second drive shaft and the cylindrical gear, so that the present disclosure realizes the purpose of driving the tension airfoil to tilt by driving the first regulation sleeve to tilt, and with a compact structure, the function of changing the angle of attack of the tension airfoil is achieved.

Preferably, the second angle of attack regulation mechanism includes a second angle of attack regulation motor, a swinging driven member cam mechanism and a second regulation sleeve;
the second regulation sleeve is threaded on the front rotation arm, at the same time, rotationally connected with the front rotation arm through the bearing, and one end face of the second regulation sleeve is fixed at the side end of the tension airfoil;

the second angle of attack regulation motor is fixed on the revolution main shaft and connected with the controller, and an output shaft of the second angle of attack regulation motor is fixed with a cam in the swinging driven member cam mechanism, and at the same time, one end of a swinging rod in the swinging driven member cam mechanism fixes an outer wall of the second regulation sleeve while the other end is in sliding connection with the outer edge of the cam in the swinging driven member cam mechanism.

In the present disclosure, the controller controls the work of the second angle of attack regulation motor, so as to drive the cam in the swinging driven member cam mechanism to rotate, then drive the swinging rod in the swinging driven member cam mechanism to swing, therefore the tension aerofoil and the second regulation sleeve may be controlled to rotate a certain dip angle relatively to the front rotation arm, then the angle of attack of the tension aerofoil is controlled, so as to change the tension.

Preferably, one rotation main shaft is rotationally connected between the front rotation arm and the rear rotation arm at each side of the revolution main shaft, and a plurality of rotor devices are fixed on the rotation main shaft at each side of the revolution main shaft.

The lifting efficiency of the present disclosure may be further improved by arranging a plurality of rotor devices on the rotation main shaft at each side.

Preferably, a plurality of rotation main shafts are rotationally connected between the front rotation arm and the rear rotation arm at each side of the revolution main shaft, and one or a plurality of rotor devices are fixed on each rotation main shaft.

In the present disclosure, a plurality of rotation main shafts are rotationally connected between the front rotation arm and the rear rotation arm at each side of the revolution main shaft, so that the lifting efficiency of the present disclosure may be further improved by fixing one or a plurality of rotor devices on each rotation main shaft.

It can be known from the above technical solution, compared with the prior art, that the present disclosure provides a flapping rotor device with uplink vertical rotation and downlink horizontal rotation, which may achieve the following technical effects:

The present disclosure provides a flapping rotor device with uplink vertical rotation and downlink horizontal rotation. Under the control of the controller, the revolution motor drives the revolution main shaft to revolve and drives the front rotation arms, the rear rotation arms, the rotation main shafts and the rotor devices to go up and down. Since the rotation planes of the rotors at the two sides of the revolution main shafts are vertical to each other, the resistance mutually generated between the rotors at the two sides and the mutual disturbance may be avoided, the stability generating the lift is improved, and the rotation planes of the rotors at the two sides of the revolution main shafts can be avoided to be all vertical, therefore the lift may be provided at least by the rotor at one side of the revolution main shaft, thereby generating the lift continuously and further improving the efficiency of generating the lift. At the same time, when the rotor at one side of the revolution main shaft lifts along the revolution main shaft, the rotor surface always keeps vertical, and the rotor surface is converted to keep horizontal through the serve motor during the process of lifting along the revolution main shaft. Meanwhile, when the rotor at the other side of the revolution main shaft lifts along the revolution main shaft, the rotor surface always keeps horizontal, and the rotor surface is converted to keep vertical through the serve motor during the process of lifting along the revolution main shaft, so that when the revolution main shafts drive the rotors to go up and down, the rotation plane of the rotor at one side of the revolution main shaft always keeps horizontal, therefore the lift of the present disclosure is obviously improved, and the stability generating the lift is obviously enhanced.

BRIEF DESCRIPTION OF THE DRAWINGS

To better clarify the embodiment of the present disclosure or the technical solution in the prior art, the drawings required to illustrate the embodiments or the prior art will be simply described below. It is apparent that the drawings described below merely illustrate some embodiments of the present disclosure. Those ordinarily skilled in the art can obtain other drawings without creative labor on the basis of those drawings.

Figure 1:
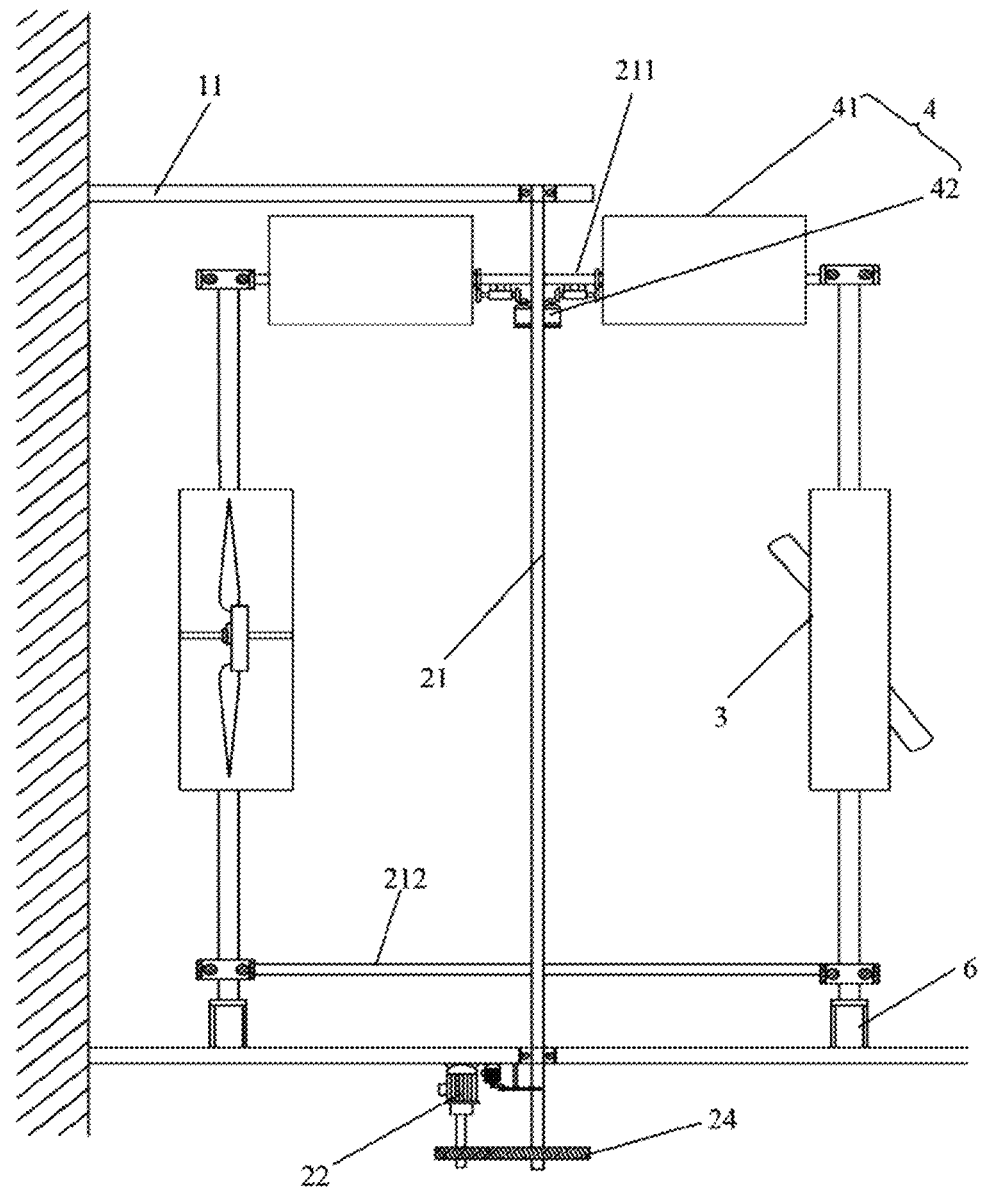
FIG. 1 is a structural schematic diagram of a flapping rotor device with uplink vertical rotation and downlink horizontal rotation in the present disclosure.
Figure 2:
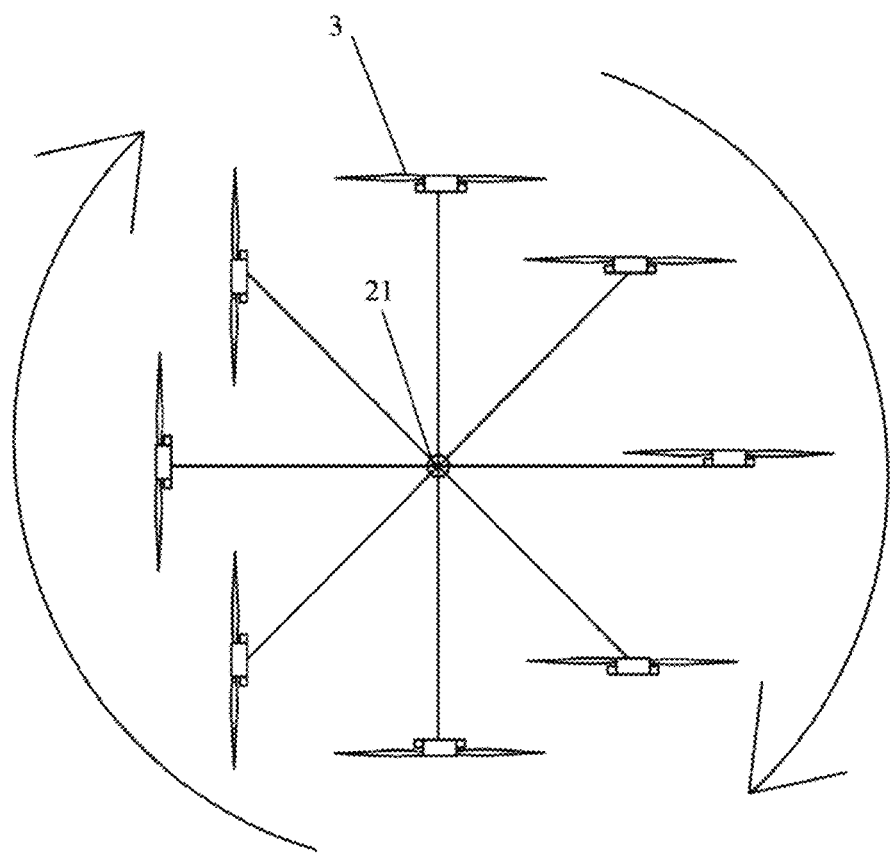
FIG. 2 is a working state schematic diagram of a rotor at one side of the revolution main shaft to go up and down along the rotation main shaft in a flapping rotor device with uplink vertical rotation and downlink horizontal rotation in the present disclosure.
Figure 3:
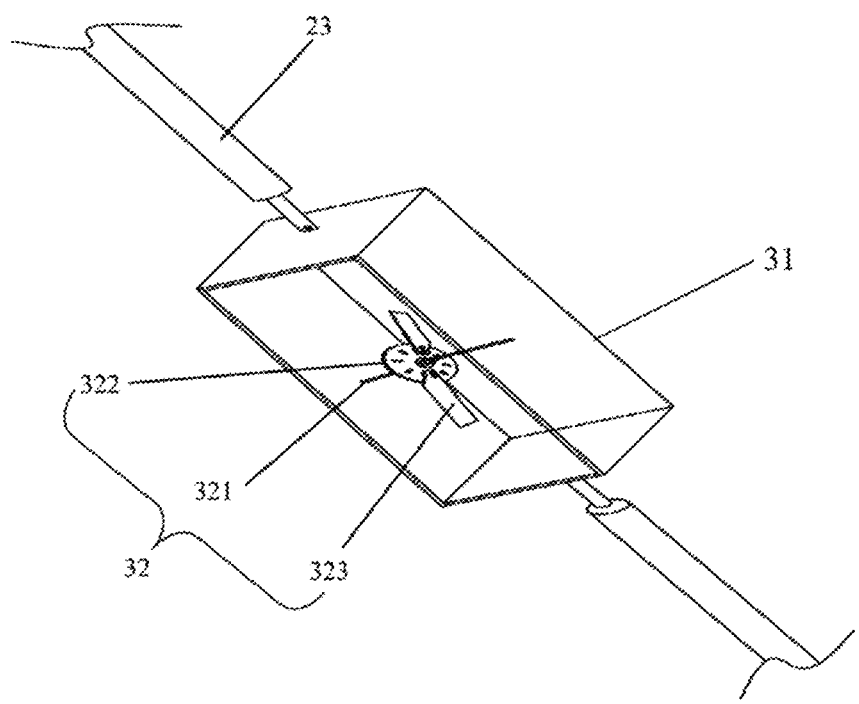
FIG. 3 is a structural schematic diagram of a rotor device in a flapping rotor device with uplink vertical rotation and downlink horizontal rotation in the present disclosure.
Figure 4:
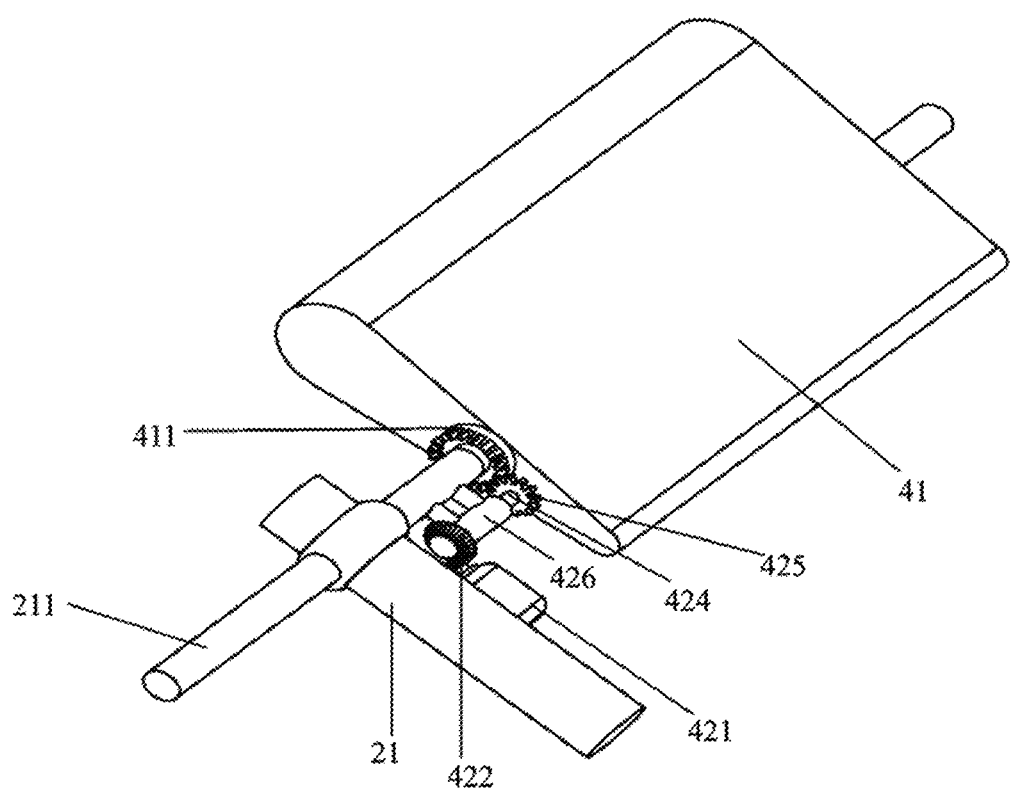
FIG. 4 is a structural schematic diagram of a first angle of attack regulation mechanism of a flapping rotor device with uplink vertical rotation and downlink horizontal rotation in the present disclosure.
Figure 5:
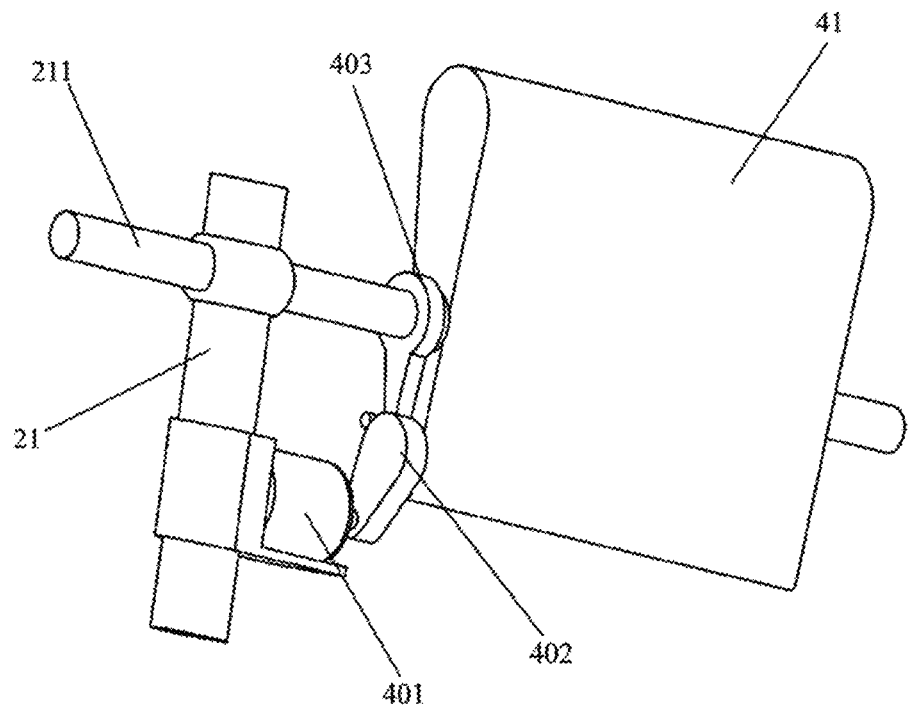
FIG. 5 is a structural schematic diagram of a second angle of attack regulation mechanism of a flapping rotor device with uplink vertical rotation and downlink horizontal rotation in the present disclosure.

11: flapping rotor support; 21: revolution main shaft; 22: revolution motor; 24: revolution drive gear set; 23: rotation main shaft; 6: servo motor; 3: rotor device; 211: front rotation arm; 212: rear rotation arm; 31: installation frame: 32: rotor; 323: rotation airfoil; 321: central shaft; 322: turntable; 4: tension device; 41: tension airfoil; 42: angle of attack regulation mechanism; 411: first regulation sleeve; 421: first angle of attack regulation motor; 422: bevel gear set; 424: second drive shaft; 425: cylindrical gear; 426: second sleeve; 401: second angle of attack regulation motor; 402: swinging drive member cam mechanism; 403: second regulation sleeve.

DETAILED DESCRIPTION OF THE EMBODIMENTS

The technical solutions in the embodiments of the present disclosure are clearly and completely elaborated below in combination with the drawings. It is apparent that the described embodiments are only a part of the embodiments of the present disclosure but not all. Based on the embodiments of the present disclosure, all the other embodiments obtained by those of ordinary skill in the art on the premise of not contributing creative effort should belong to the protection scope of the present disclosure.

In the description of the present disclosure, it is understood that orientation or position relationships indicated by the terms "upper", "lower", "front", "rear", "left", "right", "vertical", "horizontal", "top", "bottom", "inner", "outer" and the like are based on the orientation or position relationships as shown in the drawings, for ease of describing the present disclosure and simplifying the description only, rather than indicating or implying that the mentioned apparatus or element necessarily has a particular orientation and must be constructed and operated in the particular orientation. Therefore, these terms should not be understood as limitations to the present disclosure.

In addition, the terms "first" and "second" are merely used for description, instead of being understood as indicating or implying relative importance or impliedly indicating the quantity of the showed technical features. Thus, the features defined with "first" and "second" may expressly or impliedly one or more features. In the description of the present disclosure, "a plurality of" means two or above two, unless specific limitation otherwise.

In the present disclosure, unless specific regulation and limitation otherwise, terms "install", "join", "connect", "fix" and the like should be generally understood, for example, may be a fixed connection, a detachable connection, or integrated, may be a mechanical connection or an electric connection, may be a direct connection or an indirect connection through an intermediation, and may an internal connection of two elements or an interactive relationship of two elements. Those of ordinary skill in the art may understand the specific meaning of the terms in the disclosure according to specific conditions.

In the present disclosure, unless specific regulation and limitation otherwise, the first feature "onto" or "under" the second feature may include the direct contact of the first feature and the second feature, or may include the contact of the first feature and the second feature through other features between them instead of direct contact. Moreover, the first feature "onto", "above" and "on" the second feature includes that the first feature is right above and obliquely above the second feature, or merely indicates that the horizontal height of the first feature is higher than the second feature. The first feature "under", "below" and "down" the second feature includes that the first feature is right below and obliquely below the second feature, or merely indicates that the horizontal height of the first feature is less than the second feature.

One embodiment of the present disclosure relates to a flapping rotor device with uplink vertical rotation and downlink horizontal rotation, which is symmetrically arranged at the two sides of the fuselage, including:

a flapping rotor support 11, revolution main shafts 21, a revolution motor 22, a revolution drive gear set 24, rotation main shafts 23, servo motors 6, a rotor device 3 and a controller;

the revolution main shafts 21 are arranged at the two sides of the fuselage through the flapping rotor support 11 and rotationally connected with the flapping rotor support 11 through bearings, and the axial central lines of the revolution main shafts 21 are parallel to the axial central line of the fuselage. At the same time, the front ends and the tail ends of the revolution main shafts 21 are correspondingly and vertically fixed with front rotation arms 211 and rear rotation arms 212 in respective, and the front rotation arms 211 and the rear rotation arms 212 are symmetrically arranged at the two sides of the revolution main shafts 21;

the revolution motor 22 is fixed on the flapping rotor support 11 and electrically connected to the controller, and at the same time, the revolution motor 22 is in drive connection with the revolution main shafts 21 through the revolution drive gear set 24;

the rotation main shafts 23 are respectively arranged at the two sides of the revolution main shafts 21 and parallel to the revolution main shafts 21, and at the same time the two ends of the rotation main shafts 23 at each side of the revolution main shafts 21 are rotationally connected to the front rotation arms 211 and the rear rotation arms 212 through the bearings;

the servo motors 6 are fixed on the flapping rotor support 11 and electrically connected to the controller, and at the same time the servo motors 6 are in drive connection with the rotation main shafts 23 correspondingly;

the rotor devices 3 are correspondingly fixed on the rotation main shafts 23 at the two sides of the revolution main shafts 21, the rotor devices 3 include rotors 32, and the rotation planes of the rotors 32 at the two sides of the revolution main shafts 21 are vertical mutually. The rotors 32 include central shafts 321, turntables 322 and a plurality of rotation airfoils 323, central holes are formed in the centers of the turntables 322, the central shafts 321 pass through the central holes and are rotationally connected to the turntables 322 through the bearings, and at the same time the rotation airfoils 323 are symmetrical double-convex airfoil;

when the revolution motor 22 drives the revolution main shafts 21 to drive the front rotation arms 211, the rear rotation arms 212, the revolution main shafts 23 and the rotor devices 3 to lift, one servo motor 6 controls one revolution main shaft 23 correspondingly, so as to correspondingly drive the rotation plane of the rotor 32 at one side of the revolution main shaft 21 to be always horizontal, and the rotation plane of the rotor 32 at the other side of the revolution main shaft 21 to be always vertical. When the revolution motor 22 drives the revolution main shafts 21 to drive the front rotation arms 211, the rear rotation arms 212, the revolution main shafts 23 and the rotor devices 3 to decline, one servo motor 6 correspondingly controls one rotation main shaft 23, so as to correspondingly drive the rotation plane of the rotor 32 at one side of the revolution main shaft 21 to be converted to a vertical state, and the rotation plane of the rotor 32 at the other side of the revolution main shaft 21 to be converted to a horizontal state.

In order to further optimize the above technical solution, the front edge of the symmetrical double-convex airfoil is convex arc and the rear edge is a flat airfoil structure, and the upper plane and the lower plane are arc.

In order to further optimize the above technical solution, the roots of a plurality of rotation airfoils 323 are uniformly fixed on the turntable 322 along a circumferential direction and form a 0-degree dip angle with the turntable 322, and at the same time the rotation direction of the front edges of the plurality of rotation airfoils 323 along the shaft is the same.

In order to further optimize the above technical solution, each rotor device 3 further includes an installation frame 31, the shaft end of each central shaft 321 is fixed on an inner wall of the installation frame 31, and at the same time an outer wall of the installation frame 31 is fixed on the rotation main shaft 23.

In order to further optimize the above technical solution, the installation frame 31 is a hexahedral structure, of which two pairs of relative surfaces are provided with panels, and the other pair of surfaces is hollow;

wherein a pair of relative panels is fixed with the rotation main shaft 23, and the other pair of relative panels is correspondingly fixed at the two ends of the central shaft 321.

In order to further optimize the above technical solution, the installation frame 31 is a U-shaped structure, which includes two first panels arranged relatively and a second panel connecting to the two first panels, wherein the two first panels arranged relatively are fixed on the rotation main shaft 32, and one shaft end of the central shaft 321 is fixed on the second panel.

In order to further optimize the above technical solution, the present disclosure further includes a tension device 4, which includes a tension aerofoil 41 and an angle of attack regulation mechanism 42. The tension device 41 is threaded on the front rotation arm 211 and rotationally connected with the front rotation arm 211 by the bearing, the angle of attack regulation mechanism 42 is installed on the revolution main shaft 21 and the front rotation arm 211, and electrically connected with the controller, so as to drive the tension aerofoil 41 to tilt around the front rotation arm 211 to generate an angle of attack. Meanwhile, the tension aerofoil 41 is of the same structure as the rotation aerofoil 323, and the front edge of the tension aerofoil 41 is towards the front end of the fuselage.

In order to further optimize the above technical solution, the angle of attack regulation mechanism 42 includes a first angle of attack regulation mechanism and a second angle of attack regulation mechanism; and the first angle of attack regulation mechanism includes a first regulation sleeve 411, a first angle of attack regulation motor 421, a bevel gear set 422, a first drive shaft 424, a cylindrical gear 425 and a second sleeve 426;
- the first regulation sleeve 411 is threaded on the front rotation arm 211, and one end of the first regulation sleeve 411 is fixed at the side end of the tension aerofoil 41 while the other end is provided with a gear;
- the second sleeve 426 is fixed on the front rotation arm 211 through a connecting rod, at the same time rotationally connected with the front rotation arm 211 through the bearing, and the first drive shaft 424 penetrates through the second sleeve 426 and is rotationally connected with the inner wall of the second sleeve 426 through the bearing;
- the first angle of attack regulation motor 421 is fixed on the revolution main shaft 21, an output shaft of the first angle of attack regulation motor 421 is connected with one end of the first drive shaft 424 through the bevel gear set 422, at the same time the other end of the first drive shaft 424 is connected with the cylindrical gear 425, which meshes with gear teeth on the first regulation sleeve 411;
- the first angle of attack regulation motor 421 is electrically connected with the controller, and drives the first regulation sleeve 411 to title around the front rotation arm 211 through the bevel gear set 422, the second drive shaft 424 and the cylindrical gear 425 successively, so as to drive the tension aerofoil 41 to tilt and generate the angle of attack.

In order to further optimize the above technical solution, the second angle of attack regulation mechanism includes a second angle of attack regulation motor 401, a swinging driven member cam mechanism 402 and a second regulation sleeve 403;
- the second regulation sleeve 403 is threaded on the front rotation arm 211, at the same time, rotationally connected with the front rotation arm 211 through the bearing, and one end face of the second regulation sleeve 403 is fixed at the side end of the tension airfoil 41;
- the second angle of attack regulation motor 401 is fixed on the revolution main shaft 21 and connected with the controller, and an output shaft of the second angle of attack regulation motor 401 is fixed with a cam in the swinging driven member cam mechanism 402, and at the same time, one end of a swinging rod in the swinging driven member cam mechanism 402 fixes an outer wall of the second regulation sleeve 403 while the other end is in sliding connection with the outer edge of the cam in the swinging driven member cam mechanism 402.

In order to further optimize the above technical solution, one rotation main shaft 23 is rotationally connected between the front rotation arm 211 and the rear rotation arm 212 at each side of the revolution main shaft 21, and a plurality of rotor devices 3 are fixed on the rotation main shaft 23 at each side of the revolution main shaft 21.

In order to further optimize the above technical solution, a plurality of rotation main shafts 23 are rotationally connected between the front rotation arm 211 and the rear rotation arm 212 at each side of the revolution main shaft 21, and one or a plurality of rotor devices 3 are fixed on each rotation main shaft 23.

Embodiment 1

The embodiment 1 of the present disclosure relates to a flapping rotor device with uplink vertical rotation and downlink horizontal rotation, which is symmetrically arranged at the two sides of the fuselage, including:
- a flapping rotor support 11, revolution main shafts 21, a revolution motor 22, a revolution drive gear set 24, rotation main shafts 23, servo motors 6, a rotor device 3 and a controller;
- the revolution main shafts 21 are arranged at the two sides of the fuselage through the flapping rotor support 11 and rotationally connected with the flapping rotor support 11 through bearings, and the axial central lines of the revolution main shafts 21 are parallel to the axial central line of the fuselage. At the same time, the front ends and the tail ends of the revolution main shafts 21 are correspondingly and vertically fixed with front rotation arms 211 and rear rotation arms 212 in respective, and the front rotation arms 211 and the rear rotation arms 212 are symmetrically arranged at the two sides of the revolution main shafts 21;
- the revolution motor 22 is fixed on the flapping rotor support 11 and electrically connected to the controller, and at the same time, the revolution motor 22 is in drive connection with the revolution main shafts 21 through the revolution drive gear set 24;
- the rotation main shafts 23 are respectively arranged at the two sides of the revolution main shafts 21 and parallel to the revolution main shafts 21, and at the same time the two ends of the rotation main shafts 23 at each side of the revolution main shafts 21 are rotationally connected to the front rotation arms 211 and the rear rotation arms 212 through the bearings;
- the servo motors 6 are fixed on the flapping rotor support 11 and electrically connected to the controller, and at the same time the servo motors 6 are in drive connection with the rotation main shafts 23 correspondingly;
- the rotor devices 3 are correspondingly fixed on the rotation main shafts 23 at the two sides of the revolution main shafts 21, the rotor devices 3 include installation frames 31 and rotors 32, the outer walls of the installation frames 31 are fixed on the rotation main shafts 23, and the rotation planes of the rotors 32 at the two sides of the revolution main shafts 21 are vertical mutually. The rotors 3 include central shafts 321, turntables 322 and a plurality of rotation airfoils 323, central holes are formed in the centers of the turntables 322, the central shafts 321 pass through the central holes and are rotationally connected to the turntables 322 through the bearings, shaft ends of the central shafts 321 are fixed on the inner walls of the installation frame 31, at the same time the rotation airfoils 323 are symmetrical double-convex airfoils (wherein the models of the symmetrical double-convex airfoils meet the general standards for aircraft design, NACA0012 or NACA0016). The front edges of the symmetrical double-convex airfoils are convex arc and the rear edges are flat airfoil structures; the upper plane and the lower plane are arc-shaped, the roots of a plurality of rotation airfoils 323 are uniformly fixed on the turntable 322 along a circumferential direction and form a 0-degree dip angle with the turntable 322, and at the same time the rotation direction of the front edges of the plurality of rotation airfoils 323 along the shaft is the same;

when the revolution motor 22 drives the revolution main shafts 21 to drive the front rotation arms 211, the rear rotation arms 212, the rotation main shafts 23, the installation frames 31 and the rotors 32 to lift, one servo motor 6 controls one rotation main shaft 23 correspondingly, so as to correspondingly drive the rotation plane of the rotor 32 at one side of the revolution main shafts 21 to be always horizontal, and the rotation plane of the rotor 32 at the other side of the revolution main shaft 21 to be always vertical. When the revolution motor 22 drives the revolution main shafts 21 to drive the front rotation arms 211, the rear rotation arms 212, the rotation main shafts 23, the installation frames 31 and the rotors 32 to decline, one servo motor 6 correspondingly controls one rotation main shaft 23, so as to correspondingly drive the rotation plane of the rotor 32 at one side of the revolution main shaft 21 to be converted to a vertical state, and the rotation plane of the rotor 32 at the other side of the revolution main shaft 21 to be converted to a horizontal state;

wherein the installation frame 31 is a hexahedral structure, of which two pairs of relative surfaces are provided with panels, and the other pair of surfaces is hollow; a pair of relative panels is fixed with the rotation main shaft 23, and the other pair of relative panels is correspondingly fixed at the two ends of the central shaft 321, so that the rotor 31 may be protected by the installation frame 31 with the hexahedral structure, and then the service life of the rotor 32 is improved.

The present disclosure provides a flapping rotor device with uplink vertical rotation and downlink horizontal rotation. Under the control of the controller, the revolution motor 22 drives the revolution main shaft 21 to revolve and drives the front rotation arms 211, the rear rotation arms 212, the rotation main shafts 23, the installation frame 31 and the rotor 32 to go up and down through the revolution drive gear set 24. Since the rotation planes of the rotors 32 at the two sides of the revolution main shafts 21 are vertical to each other, the resistance mutually generated between the rotors 32 at the two sides and the mutual disturbance may be avoided, the stability generating the lift is improved, and the rotation planes of the rotors 32 at the two sides of the revolution main shafts 21 can be avoided to be all vertical, therefore the lift may be provided at least by the rotor 32 at one side of the revolution main shaft 21, thereby generating the lift continuously and further improving the efficiency of generating the lift. At the same time, when the rotor 32 at one side of the revolution main shaft 21 lifts along the revolution main shaft 21, the rotor 32 surface always keeps vertical, and the rotor surface is converted to keep horizontal through the serve motor 6 during the process of lifting along the revolution main shaft 21. Meanwhile, when the rotor 32 at the other side of the revolution main shaft 21 lifts along the revolution main shaft 21, the rotor 32 surface always keeps horizontal, and the rotor 32 surface is converted to keep vertical through the serve motor 6 during the process of lifting along the revolution main shaft 21, so that when the revolution main shafts 21 drive the rotors 32 to go up and down, the rotation plane of the rotor 32 at one side of the revolution main shaft 21 always keeps horizontal, therefore the lift of the present disclosure is obviously improved, and the stability generating the lift is obviously enhanced.

Embodiment 2

Different from the embodiment 1, the installation frame 31 is a U-shaped structure, which includes two first panels arranged relatively and a second panel connecting to the two first panels, wherein the two first panels arranged relatively are fixed on the rotation main shaft 32, and one shaft end of the central shaft 321 is fixed on the second panel.

In the present disclosure, the installation frame 31 is set as the two first panels arranged relatively and the second panel connecting with the two first panels, so that the first panels arranged relatively may be fixedly connected with the rotation main shaft 23, the rotor 32 is arranged on the rotation main shaft 23 and the central shaft is fixed through the second panel, and the airflow can be provided in other directions to drive the turntable 322 of the rotor 32 to rotate relatively to the central shaft, therefore the strength of the airflow driving the turntable 322 to rotate may be improved, and the cost is reduced.

Embodiment 3

Based on the embodiment 1, this embodiment further includes a tension device 4, which includes a tension aerofoil 41 and an angle of attack regulation mechanism 42. The tension device 41 is threaded on the front rotation arm 211 and rotationally connected with the front rotation arm 211 by the bearing, the angle of attack regulation mechanism 42 is installed on the revolution main shaft 21 and the front rotation arm 211, and electrically connected with the controller, so as to drive the tension aerofoil 41 to tilt around the front rotation arm 211 to generate an angle of attack. Meanwhile, the tension aerofoil 41 is of the same structure as the rotation aerofoil 323, and the front edge of the tension aerofoil is towards the front end of the fuselage;

wherein the angle of attack regulation mechanism 42 is a first angle of attack regulation mechanism; and the first angle of attack regulation mechanism includes a first regulation sleeve 411, a first angle of attack regulation motor 421, a bevel gear set 422, a first drive shaft 424, a cylindrical gear 425 and a second sleeve 426;

the first regulation sleeve 411 is threaded on the front rotation arm 211, and one end of the first regulation sleeve 411 is fixed at the side end of the tension aerofoil 41 while the other end is provided with a gear;

the second sleeve 426 is fixed on the front rotation arm 211 through a connecting rod, at the same time rotationally connected with the front rotation arm 211 through the bearing, and the first drive shaft 424 penetrates through the second sleeve 426 and is rotationally connected with the inner wall of the second sleeve 426 through the bearing;

the first angle of attack regulation motor 421 is fixed on the revolution main shaft 21, an output shaft of the first angle of attack regulation motor 421 is connected with one end of the first drive shaft 424 through the bevel gear set 422, at the same time the other end of the first drive shaft 424 is connected with the cylindrical gear 425, which meshes with gear teeth on the first regulation sleeve 411;

the first angle of attack regulation motor 421 is electrically connected with the controller, and drives the first regulation sleeve 411 to title around the front rotation arm 211 through the bevel gear set 422, the second drive shaft 424 and the cylindrical gear 425 successively, so as to drive the tension aerofoil 41 to tilt and generate the angle of attack.

In the present disclosure, the front rotation arm 211 is rotationally connected with the tension aerofoil 41, so that the tension aerofoil 41 is of the same structure as the rotation aerofoil 323, and the front edge of the tension aerofoil 41 is towards the front end of the fuselage, so the driving force of the first angle of attack regulation motor 421 is delivered to the first regulation sleeve 411 by the bevel gear set 422, the second drive shaft 424 and the cylindrical gear 425 under the drive of the first angle of attack regulation motor 421, then the first regulation sleeve 411 may drive the tension aerofoil 41 to tilt; therefore the angle of attack of the tension aerofoil 41 may be regulated, then the tension that the fuselage navigates onwards may be changed by providing the tension aerofoil 41, meanwhile the lift may be assisted, and the lifting efficiency may be improved.

Embodiment 4

Different from the embodiment 3, the second angle of attack regulation mechanism includes a second angle of attack regulation motor 401, a swinging driven member cam mechanism 402 and a second regulation sleeve 403;

the second regulation sleeve 403 is threaded on the front rotation arm 211, at the same time, rotationally connected with the front rotation arm 211 through the bearing, and one end face of the second regulation sleeve 403 is fixed at the side end of the tension airfoil 41;

the second angle of attack regulation motor 401 is fixed on the revolution main shaft 21 and connected with the controller, and an output shaft of the second angle of attack regulation motor 401 is fixed with a cam in the swinging driven member cam mechanism 402, and at the same time, one end of a swinging rod in the swinging driven member cam mechanism 402 fixes an outer wall of the second regulation sleeve 403 while the other end is in sliding connection with the outer edge of the cam in the swinging driven member cam mechanism 402.

Embodiment 5

Based on the embodiment 3, one rotation main shaft 23 is rotationally connected between the front rotation arm 211 and the rear rotation arm 212 at each side of the revolution main shaft 21, and a plurality of rotor devices 3 are fixed on the rotation main shaft 23 at each side of the revolution main shaft 21.

The lifting efficiency of the present disclosure may be further improved by arranging a plurality of rotor devices 3 on the rotation main shaft 23 at each side.

Embodiment 6

Based on the embodiment 4, a plurality of rotation main shafts 23 are rotationally connected between the front rotation arm 211 and the rear rotation arm 212 at each side of the revolution main shaft 21, and one or a plurality of rotor devices 3 are fixed on each rotation main shaft 23.

In the present disclosure, a plurality of rotation main shafts 23 are rotationally connected between the front rotation arm 211 and the rear rotation arm 212 at each side of the revolution main shaft 21, so that the lifting efficiency of the present disclosure may be further improved by fixing one or a plurality of rotor devices 3 on each rotation main shaft 23.

Various embodiments in the specification are described in a progressive manner, each embodiment focuses on the difference from other embodiments, and the same and similar parts of various embodiments can be referred to each other. For the device provided by the embodiment, the device corresponds to the method provided by the embodiment, so the device is simply described, and the related part may refer to the partial description of the method.

For the above description of the embodiment, those of professional skill in the art may realize or use the present disclosure. A plurality of modifications to these embodiments are apparent to those of professional skill in the art, and the general principles defined in the present disclosure may be achieved in other embodiments without deviating from the spirit and scope of the present disclosure. Therefore, the present disclosure is not limited to these embodiments shown in the present disclosure, and meets the widest range consistent to the principle and novel features of the present disclosure.

What is claimed is:

1. A flapping rotor device with uplink vertical rotation and downlink horizontal rotation, comprising:
    a flapping rotor support (11), revolution main shafts (21), a revolution motor (22), a revolution drive gear set (24), rotation main shafts (23), servo motors (6), a rotor device (3) and a controller;
    wherein front ends and tail ends of the revolution main shafts (21) are correspondingly and vertically fixed with front rotation arms (211) and rear rotation arms (212) respectively, and the front rotation arms (211) and the rear rotation arms (212) are symmetrically arranged at the two sides of the revolution main shafts (21);
    wherein the revolution motor (22) is fixed on the flapping motor support (11) and electrically connected to the controller, and the revolution motor (22) is in drive connection with the revolution main shafts (21) through the revolution drive gear set (24);
    wherein the rotation main shafts (23) are arranged at the two sides of the revolution main shafts (21) and parallel to the revolution main shafts (21), and two ends of the rotation main shafts (23) at each side of the revolution main shafts (21) are rotationally connected to the front rotation arms (211) and the rear rotation arms (212) through bearings;
    wherein the servo motors (6) are fixed on the flapping rotor support (11) and electrically connected to the controller, and the servo motors (6) are in drive connection with the rotation main shafts (23) correspondingly;

wherein the rotor devices (3) are correspondingly fixed on the rotation main shafts (23) at the two sides of the revolution main shafts (21), the rotor devices (3) further comprising rotors (32), and a rotation plane of one of the rotors (32) is parallel to a horizontal plane, a rotation plane of another of the rotors (32) is perpendicular to the horizontal plane; the rotors (32) further comprising central shafts (321), turntables (322) and a plurality of rotation airfoils (323), wherein central holes are formed in the centers of the turntables (322), wherein the central shafts (321) pass through the central holes and are rotationally connected to the turntables (322) through the bearings, and the rotation airfoils (323) are symmetrical double-convex airfoil; and wherein when the revolution motor (22) drives the revolution main shafts (21) to drive the front rotation arms (211), the rear rotation arms (212), the rotation main shafts (23) and the rotor devices (3), wherein one servo motor (6) controls one rotation main shaft (23) correspondingly, to drive the rotation plane of the rotor (32) at one side of the revolution main shaft (21) to be always horizontal, and the rotation plane of the rotor (32) at the other side of the revolution main shaft (21) to be always vertical; wherein when the revolution motor (22) drives the revolution main shafts (21) to drive the front rotation arms (211), the rear rotation arms (212), the revolution main shafts (23) and the rotor devices (3) to decline, wherein one servo motor (6) correspondingly controls one rotation main shaft (23), so as to correspondingly drive the rotation plane of the rotor (32) at one side of the revolution main shaft (21) to be converted to a vertical state, and wherein the rotation plane of the rotor (32) at the other side of the revolution main shaft (21) to be converted to a horizontal state.

2. The flapping rotor device with uplink vertical rotation and downlink horizontal rotation according to claim 1, wherein a front edge of the symmetrical double-convex airfoil is a convex arc and a rear edge is a flat airfoil structure, and upper plane and lower plane are arcs.

3. The flapping rotor device with uplink vertical rotation and downlink horizontal rotation according to claim 2, wherein the roots of a plurality of rotation airfoils (323) are uniformly fixed on the turntable (322) along a circumferential direction and form a 0-degree dip angle with the turntable (322), and wherein the front edges of the plurality of rotation airfoils (323) along the shaft have same rotation direction.

4. The flapping rotor device with uplink vertical rotation and downlink horizontal rotation according to claim 3, wherein each rotor device (3) further comprising an installation frame (31), wherein a shaft end of the central shaft (321) is fixed on the inner wall of the installation frame (31), and wherein an outer wall of the installation frame (31) is fixed on the rotation main shaft (23).

5. The flapping rotor device with uplink vertical rotation and downlink horizontal rotation according to claim 4, wherein the installation frame (31) is a hexahedral structure, wherein two pairs of relative surfaces are provided with panels, and wherein another pair of surfaces is hollow; wherein a pair of relative panels is fixed with the rotation main shaft (23), and an other pair of relative panels is correspondingly fixed at the two ends of the central shaft (321).

6. The flapping rotor device with uplink vertical rotation and downlink horizontal rotation according to claim 4, wherein the installation frame (31) is a U-shaped structure, comprising two first panels arranged relatively and a second panel connecting to the two first panels, wherein two first panels are fixed on the rotation main shaft (32), and one shaft end of the central shaft (321) is fixed on the second panel.

7. The flapping rotor device with uplink vertical rotation and downlink horizontal rotation according to claim 1, wherein the flapping rotor device further comprising a tension device (4), wherein the tension device further comprises a tension aerofoil (41) and an angle of attack regulation mechanism (42), wherein the tension device (41) is threaded on the front rotation arm (211) and rotationally connected with the front rotation arm (211) by the bearing, the angle of attack regulation mechanism (42) is installed on the revolution main shaft (21) and the front rotation arm (211), and electrically connected with the controller to drive the tension aerofoil (41) to tilt around the front rotation arm (211) to generate an angle of attack, wherein the tension aerofoil (41) is of the same structure as the rotation aerofoil (323), and front edge of the tension aerofoil (41) is arranged towards the front end of the fuselage.

8. The flapping rotor device with uplink vertical rotation and downlink horizontal rotation according to claim 7, wherein the angle of attack regulation mechanism (42) further comprising a first angle of attack regulation mechanism and a second angle of attack regulation mechanism; and wherein the first angle of attack regulation mechanism comprising a first regulation sleeve (411), a first angle of attack regulation motor (421), a bevel gear set (422), a second drive shaft (424), a cylindrical gear (425) and a second sleeve (426);

wherein the first regulation sleeve (411) is threaded on the front rotation arm (211), and one end of the first regulation sleeve (411) is fixed at the side end of the tension aerofoil (41) while another end is provided with a gear;

wherein the second sleeve (426) is fixed on the front rotation arm (211) through a connecting rod, at the same time rotationally connected with the front rotation arm (211) through the bearing, and the second drive shaft (424) penetrates through the second sleeve (426) and is rotationally connected with the inner wall of the second sleeve (426) through the bearing;

wherein the first angle of attack regulation motor (421) is fixed on the revolution main shaft (21), an output shaft of the first angle of attack regulation motor (421) is connected with one end of the second drive shaft (424) through the bevel gear set (422), another end of the second drive shaft (424) is connected with the cylindrical gear (425), which meshes with gear teeth on the first regulation sleeve (411); and wherein the first angle of attack regulation motor (421) is electrically connected with the controller, and drives the first regulation sleeve (411) to tilt around the front rotation arm (211) through the bevel gear set (422), the second drive shaft (424) and the cylindrical gear (425) successively, to drive the tension aerofoil (41) to tilt and generate the angle of attack.

9. The flapping rotor device with uplink vertical rotation and downlink horizontal rotation according to claim 8, wherein one rotation main shaft (23) is rotationally connected between the front rotation arm (211) and the rear rotation arm (212) at each side of the revolution main shaft (21), and a plurality of rotor devices (3) are fixed on the rotation main shaft (23) at each side of the revolution main shaft (3).

10. The flapping rotor device with uplink vertical rotation and downlink horizontal rotation according to claim 8, wherein a plurality of rotation main shafts (23) are rotationally connected between the front rotation arm (211) and the rear rotation arm (212) at each side of the revolution main shaft (21), and at least one of rotor devices (3) are fixed on each rotation main shaft (23).

* * * * *